United States Patent
Rambhia

(10) Patent No.: US 7,464,171 B2
(45) Date of Patent: Dec. 9, 2008

(54) EFFECTIVE PROTECTION OF COMPUTER DATA TRAFFIC IN CONSTRAINED RESOURCE SCENARIOS

(75) Inventor: Avni H. Rambhia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/956,451

(22) Filed: Oct. 1, 2004

(65) Prior Publication Data

US 2006/0075135 A1 Apr. 6, 2006

(51) Int. Cl.
*G06F 15/173* (2006.01)
*G06F 15/16* (2006.01)

(52) U.S. Cl. .................... 709/231; 709/223; 709/236

(58) Field of Classification Search ............. 709/223, 709/231, 236
See application file for complete search history.

(56) References Cited

U.S. PATENT DOCUMENTS 5,278,844 A * 1/1994 Murphy et al. ............ 714/778

2001/0009548 A1 * 7/2001 Morris ...................... 370/392

* cited by examiner

*Primary Examiner*—Jason D Cardone
*Assistant Examiner*—Tanim Hossain
(74) *Attorney, Agent, or Firm*—Workman Nydegger

(57) ABSTRACT

Described is a system and method that protect certain classes of sensitive data traveling across an accessible transmission medium, such as an internal bus in a device, from automated attacks. The protection is particularly useful for resource-constrained and/or security constrained components. Automated attacks depend on analyzing data characteristics such as bit pattern signatures and/or frequency distributions to succeed. To preclude such automated attacks, various alternatives of the present invention internally alter the sensitive data at a data source prior to transmission, in a synchronized way such that the altered data is internally reversible at the destination resource. Data alteration includes interspersing random data into a data stream (e.g., bitstream or stream of packets), and interspersing data of varying length on the bus. Synchronization algorithms enable the data source and the destination resource to pad and remove the interspersed data in relatively complex ways even with resource-constrained and/or security constrained components.

16 Claims, 6 Drawing Sheets

EFFECTIVE PROTECTION OF COMPUTER DATA TRAFFIC IN CONSTRAINED RESOURCE SCENARIOS

FIELD OF THE INVENTION

The invention relates generally to computing devices, and more particularly to increasing security of data communication between computing device resources.

BACKGROUND

One type of computer-related attack is based on an inherent access to sensitive data that is traveling over an easily monitored path, for example, data traveling on an open bus. Mechanical methods (e.g., based on board circuit layout) can be used to reduce the accessibility of an open path, but these are not always practical and increase cost. A simple but also generally impractical solution to this problem is to not allow sensitive data travel over accessible paths. This is often not possible for a significant number of resource designs, such as those in which cost, performance requirements and/or current chip capabilities preclude media decryption and decompression from being feasibly implemented in the same physical module.

Another apparent solution would be to strongly encrypt any sensitive data that may be accessible to a hacker. However this solution is not feasible in many instances, because, among other reasons, this requires public key cryptography and/or secure key storage capability in one or both modules, which is at present a very expensive solution. Thus, strong cryptographic protection of the key often remains an unfulfilled need. In such a situation, the key used to encrypt the data, and/or the key used to encrypt the encryption key, eventually needs to be transferred from one module to another.

For compressed data, the limitation is one of processing power in the resources. For example, it is precisely when a decoder chip is incapable of performing real-time decryption on media that the data travels on an open bus in the clear. Therefore, encrypting this data to protect it is not an option.

A significant percentage of data-related security attacks to easily accessible data result from the ability to automate the analysis of the data. To this end, software and/or hardware tools analyze transmitted data looking to match known probability patterns, bit pattern signatures and/or frequency distributions. For example, one type of attack attempts to extract compressed media from data tapped off a bus by searching for start codes and estimating packet lengths.

As mentioned above, with encryption-based solutions, the inability to securely perform public key cryptography in a data decryption module (where "data" refers to code, media, text, or any other digital information) means that a data decryption key travels from the encryption module to the decryption module. As a result, even with encrypted data, in such a "security-constrained" environment, the data is not necessarily safe from an automated discovery attack. For example, attacks exist that attempt to discover the transmitted encryption key via correct decryption hypothesis. Some repetitive trial and error is required, but automated tools allow this to be accomplished; when the key is discovered, it becomes readily apparent from the signature of the data.

What is needed is a way to frustrate automated-analysis-types of attacks in constrained-resource scenarios. Although manual attacks are still possible, it has been found that manual attacks require a high skill level and are expensive, and thus do not spread at anywhere near the rate of that automated attacks spread, which only require a small expense and a low-skill level.

SUMMARY OF THE INVENTION

Briefly, the present invention is directed towards a system and method in which a data source internally alters data prior to transmission on an accessible transmission medium, and a destination resource reversibly alters the received data, thereby protecting against automated attacks that look for patterns in unaltered data. The system and method are intended to work with modules in which conventional encryption/decryption techniques are unavailable, e.g., resource constrained modules that lack the computational power needed to perform the encryption and/or decryption, and/or security-constrained computer modules, in which the key needs to be transmitted to the destination thereby enabling its discovery via automated techniques. In this manner, various resource and/or security-constrained computer modules, such as those communicating over an internal bus, are able to protect transferred data by using synchronized logic to modify data prior to transmission and reverse modify it after receipt, such that the data that is transmitted confuses and/or breaks automated analysis techniques.

More particularly, when a data source module such as a CPU, graphics card, consumer electronics device (e.g., portable audio/video player) needs to transmit some amount of sensitive data to a resource over a transmission medium such as a bus, the data source uses an alteration mechanism to alter the original source data in some reversible way. For example, the alteration mechanism may intersperse meaningless or intentionally false data into the data stream as appropriate, e.g., as one or more bits, blocks, packets or other data groupings.

At the destination resource, a reverse alteration mechanism reverses the altered data to reconstruct a copy of the original source data. The reverse alteration mechanism may comprise an extraction mechanism that discards the interspersed data.

To keep the source and destination modules synchronized with respect to what parts of the data is altered and reverse altered, a number of algorithms may be provided that may vary based on some external factor to make the algorithm difficult to discover external to the modules. For example, the system clock or a counter may be used to vary the operating modes at the source and destination over time, so that the data (e.g., bits) that are padded and removed are not consistently the same ones from the perspective of an outside observer. Information may also be concealed within the padded data to help synchronize.

Alternative implementations may combine an interspersion mechanism with a rearrangement mechanism so that not only is data padded before transmission but order of the data (e.g., certain bits or packets) is also rearranged. A like rearrangement and extraction mechanism on the data source reconstructs the received data into a copy of the original data.

Another alternative deals with a security-constrained resource in which a key (or an encrypted key) is transmitted to the destination resource to perform decryption. Variable length data may be interspersed to frustrate automated attacks that operate by probability analysis in which the key can be automatically found by trying values as the key and looking for signatures of patterns of bit distributions.

Another type of data that may be protected via various aspects of the present invention includes compressed media content, in which start codes are followed by media data blocks combined with control data blocks. By altering the data, such as by inserting decoy packets (e.g., blocks specifically intended to fool an analyzer), automated tools will be unable to recognize the patterns needed to steal the data.

Other advantages will become apparent from the following detailed description when taken in conjunction with the drawings, in which:

DETAILED DESCRIPTION

Exemplary Operating Environments

Figure 1A:
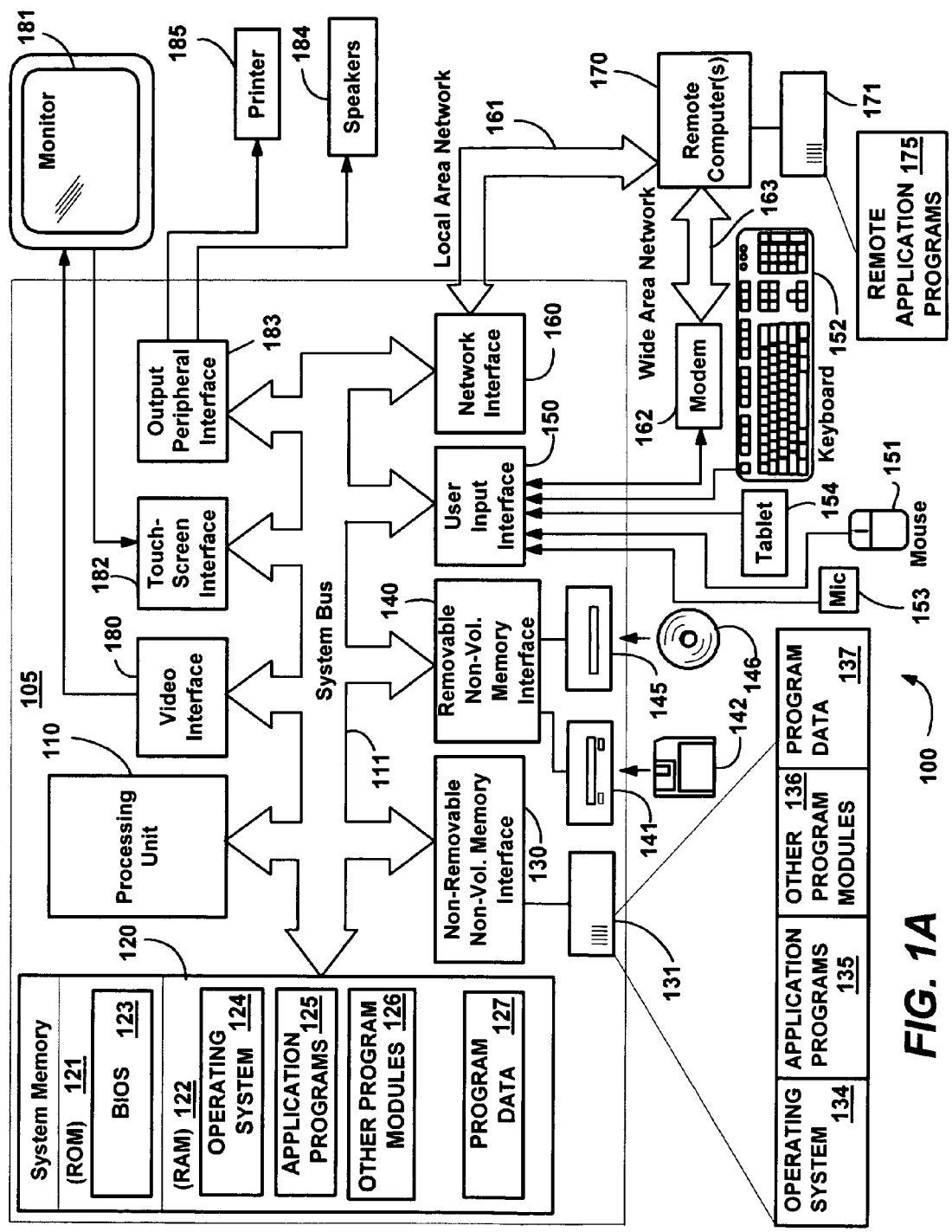
FIG. 1A is a block diagram generally representing a computer system into which the present invention may be incorporated.

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1A, an exemplary system for implementing the invention includes a general purpose computing device in the form of a computer 105. Components of the computer 105 may include, but are not limited to, a processing unit 110, a system memory 120, and a system bus 111 that couples various system components including the system memory to the processing unit 110. The system bus 111 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 105 typically includes a variety of computer-readable media. Computer-readable media can be any available media that can be accessed by the computer 105 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 105. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 120 includes computer storage media in the form of volatile and/or nonvolatile memory such as read only memory (ROM) 121 and random access memory (RAM) 122. A basic input/output system 123 (BIOS), containing the basic routines that help to transfer information between elements within computer 105, such as during start-up, is typically stored in ROM 121. RAM 122 typically contains data and/or program modules that are immediately accessible to and/or presently being operated on by processing unit 110. By way of example, and not limitation, FIG. 1A illustrates operating system 124, application programs 125, other program modules 126 and program data 127.

The computer 105 may also include other removable/non-removable, volatile/nonvolatile computer storage media. By way of example only, FIG. 1A illustrates a hard disk drive 131 that reads from or writes to non-removable, nonvolatile magnetic media, a magnetic disk drive 141 that reads from or writes to a removable, nonvolatile magnetic disk 142, and an optical disk drive 145 that reads from or writes to a removable, nonvolatile optical disk 146 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 131 is typically connected to the system bus 111 through a non-removable memory interface such as interface 130, and magnetic disk drive 141 and optical disk drive 145 are typically connected to the system bus 111 by a removable memory interface, such as interface 140.

The drives and their associated computer storage media, discussed above and illustrated in FIG. 1A, provide storage of computer-readable instructions, data structures, program modules and other data for the computer 105. In FIG. 1A, for example, hard disk drive 131 is illustrated as storing operating system 134, application programs 135, other program modules 136 and program data 137. Note that these components can either be the same as or different from operating system 124, application programs 125, other program modules 126, and program data 127. Operating system 134, application programs 135, other program modules 136, and program data 137 are given different numbers herein to illustrate that, at a minimum, they are different copies. A user may enter commands and information into the computer 105 through input devices such as a tablet, or electronic digitizer, 154, a microphone 153, a keyboard 152 and pointing device 151, commonly referred to as mouse, trackball or touch pad. Other input devices not shown in FIG. 1A may include a joystick, game pad, satellite dish, scanner, or the like. These and other input devices are often connected to the processing unit 110 through a user input interface 150 that is coupled to the system bus, but may be connected by other interface and bus structures, such as a parallel port, game port or a universal serial bus (USB). A monitor 181 or other type of display device is also connected to the system bus 111 via an interface, such as a video interface 180. The monitor 181 may also be integrated with a touch-screen panel or the like. Note that the monitor and/or touch screen panel can be physically coupled to a housing in which the computing device 105 is incorporated, such as in a tablet-type personal computer. In addition, computers such as the computing device 105 may also include other peripheral output devices such as speakers 184 and printer 185, which may be connected through an output peripheral interface 183 or the like.

The computer 105 may operate in a networked environment using logical connections to one or more remote computers, such as a remote computer 170. The remote computer 170 may be a personal computer, a server, a router, a network PC, a peer device or other common network node, and typically includes many or all of the elements described above relative to the computer 105, although only a memory storage device 171 has been illustrated in FIG. 1A. The logical connections depicted in FIG. 1A include a local area network (LAN) 161 and a wide area network (WAN) 163, but may also include other networks. Such networking environments are commonplace in offices, enterprise-wide computer networks, intranets and the Internet.

When used in a LAN networking environment, the computer 105 is connected to the LAN 161 through a network interface or adapter 160. When used in a WAN networking environment, the computer 105 typically includes a modem 162 or other means for establishing communications over the WAN 163, such as the Internet. The modem 162, which may be internal or external, may be connected to the system bus 111 via the user input interface 150 or other appropriate mechanism. In a networked environment, program modules depicted relative to the computer 105, or portions thereof, may be stored in the remote memory storage device. By way of example, and not limitation, FIG. 1A illustrates remote application programs 175 as residing on memory device 171. It will be appreciated that the network connections shown are exemplary and other means of establishing a communications link between the computers may be used.

Figure 1B:
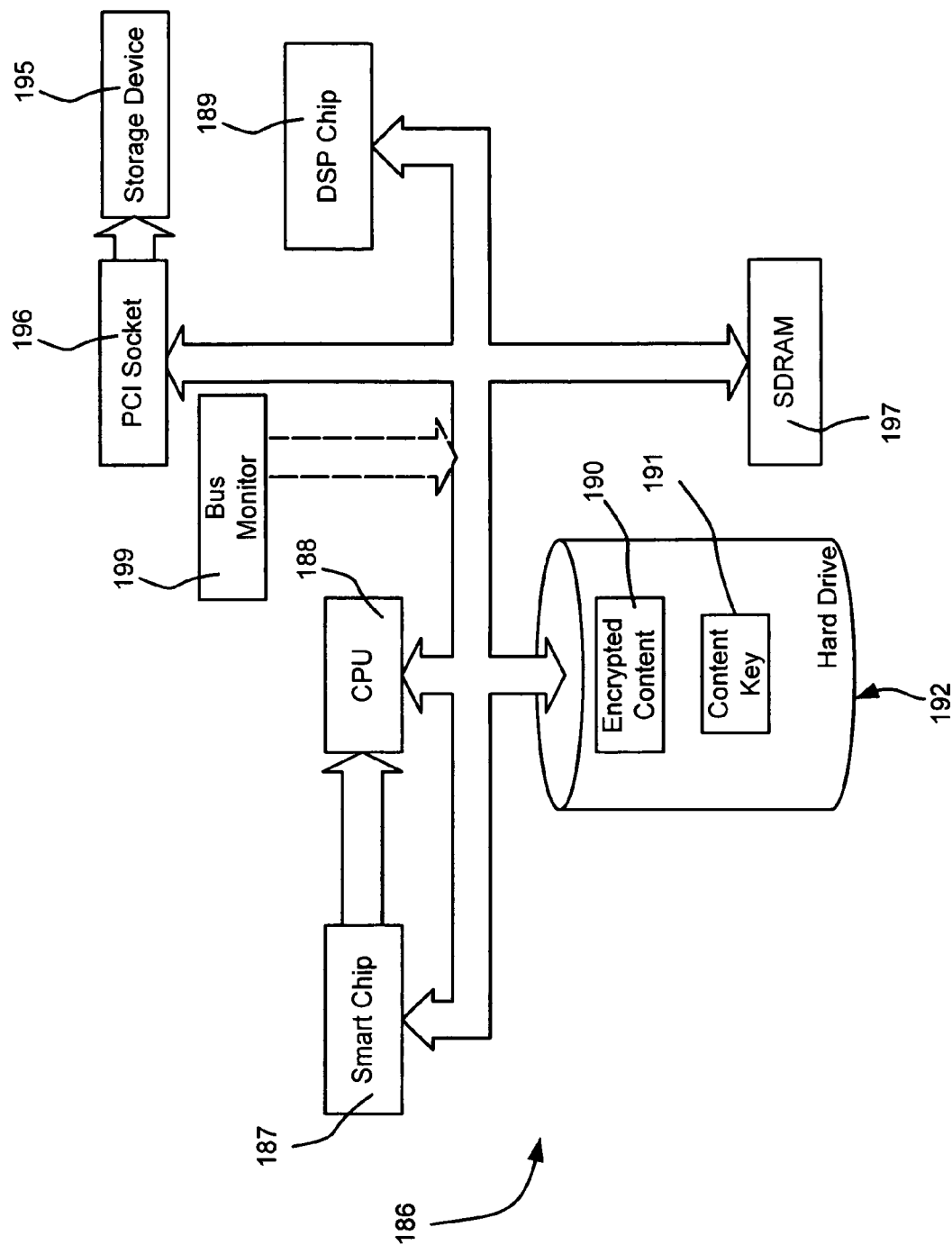
FIG. 1B is a block diagram generally representing a consumer electronics device into which the present invention may be incorporated.

FIG. 1B shows an alternative architecture 186, such as of a consumer electronics device or the like. The device architecture represented in FIG. 1B includes a smart chip 187 (e.g., on a card) to store and use its device key, a CPU 188 for decryption and other processing, and a DSP (digital signal processing) chip 189 for decoding video. Note that not all consumer electronic devices include a smart chip, as some may store the private key in software as part of the code which is stored in the hard disk or other external memory and moved to the CPU for execution, while some may permanently store the private key within the CPU module; others may use some combination of both. The encrypted content 190 and license, which contains the content key 191 and is encrypted with the device key, are stored on the device's hard drive 192. As will be understood, there are two ways to steal the content 190, namely by stealing it when it is decrypted and is in the clear, or by stealing the content key 191.

To play the content, the license is first sent to the smart chip 187. The smart chip 187 extracts the content key 191, and protects it using one of several mechanisms such as a secret obfuscation algorithm or encryption based on a key sent to it from the CPU using PKI (which is feasible in this part of the architecture since the smart chip contains a private key). The smart chip 187 then sends the protected key over an open bus to the CPU 188. The CPU 188 strips the protection off the key, making the content key now in the clear.

The content 190 flows over an open bus to the CPU 188, but is protected by encryption. The content 190 is decrypted in the chip 187. The clear, compressed content then travels over an open bus to the DSP 189 for decoding. The DSP 189 is resource limited, so the device cannot use encryption to protect the content in transit. This is where the current invention would be used to protect this data. In the absence of such protection, the data could be stolen in a variety of ways. For example, if this bus is a socketed PCI bus, then a user can simply plug in a mass storage device 195 to the PCI socket 196 to capture the content. Alternatively, particularly if there is no PCI socket, then a bus monitor 199 (or logic analyzer or similar device) can be used to capture the data and send it to an automated tool to extract the compressed media.

After processing in the DSP chip 189, the decoded content is transferred back to the CPU 188. This content could also be stolen over the bus, but the much higher bandwidth makes this more difficult. Output protection is inserted in the CPU 188, and the media is now ready for rendering.

Protecting Computer Data Traffic

The present invention is generally directed towards a system and method by which various computer modules, such as those communicating over an internal bus, may protect transferred data, particularly sensitive data, against automated attacks. As will be understood, numerous ways to implement the present invention are feasible, and only some of the highly-beneficial alternatives are described herein. For example, various aspects of the present invention are described below with reference to a resource constrained destination module that does not have sufficient computational processing power to perform complex decryption algorithms in real time. Alternatively, various aspects of the present invention are described below with reference to a security constrained destination module that is capable of data decryption, but requires that a key be transmitted to it. Notwithstanding, the present invention is not limited to any particular examples, but rather may be used in other types of scenarios, such as in addition to conventional encryption/decryption techniques, and/or over other types of communications media, including an external transmission medium. Thus, the present invention provides benefits and advantages in computing in general.

Figure 2:
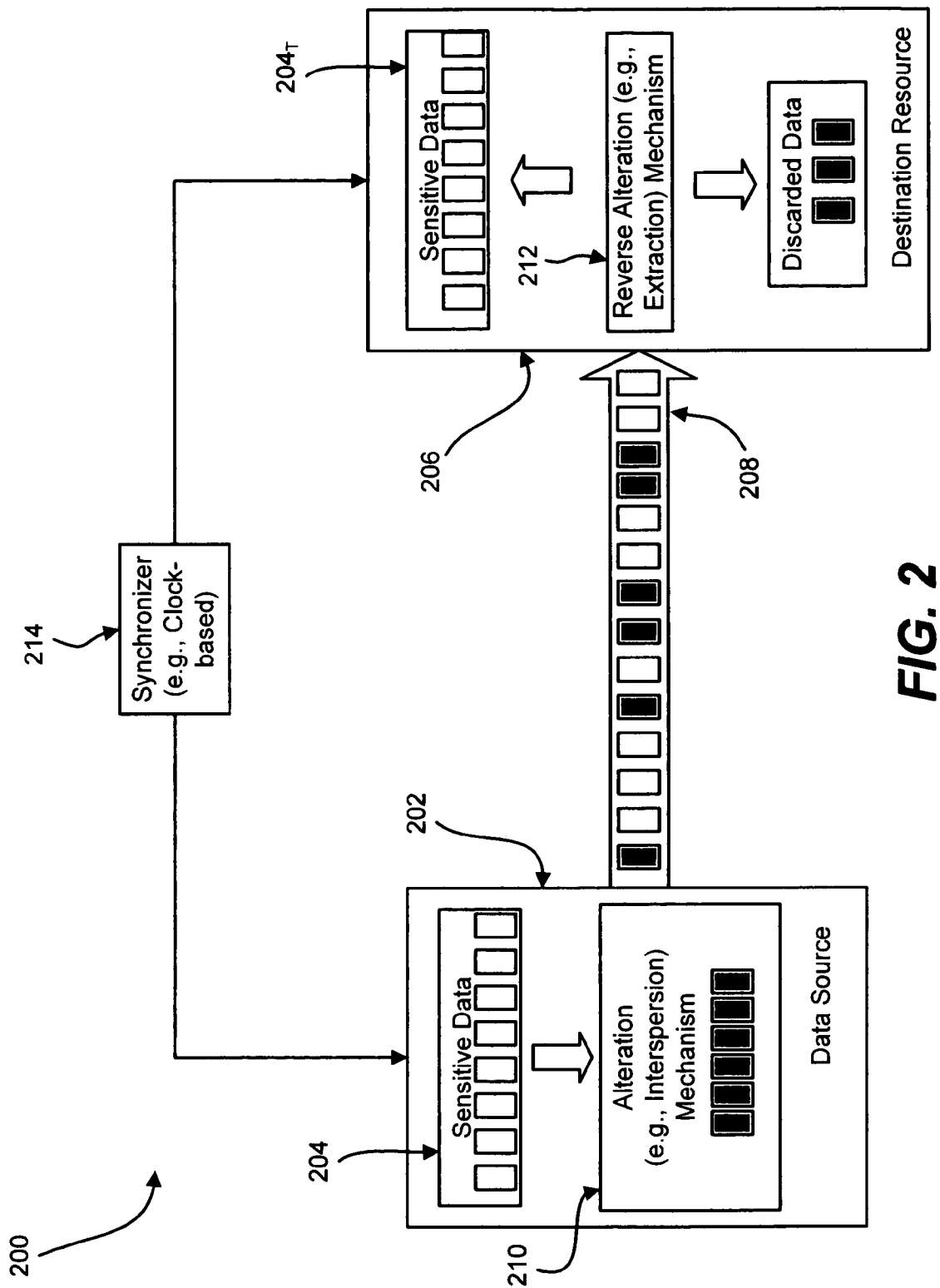
FIG. 2 is a block diagram generally representing an example data source and constrained resource architecture in which data is selectively altered at the data source and reverse altered at the destination resource to hinder automated attacks, in accordance with various aspects of the present invention.

As generally represented in FIG. 2, there is shown an example architecture 200 in which a data source module 202 such as a CPU, graphics card, consumer electronics device (e.g., media player) needs to transmit some amount of sensitive data 204 to a resource 206. Sensitive data comprises any information that may be desirable to protect from access, examples of which include software (e.g., to avoid reverse engineering), media content (e.g., audio, video, images, animations and the like), text, financial information, documents, and so forth. A transmission medium 208 such as a bus couples the data source 202 and the resource 206. Note that although not shown in FIG. 2 for purposes of simplicity, it is understood that data may be exchanged in either direction, e.g., the resource 206 may switch to a source role and the module 202 to a destination role (not necessarily for sensitive data), an acknowledge or synchronization message may be sent back, and so forth.

In the example of FIG. 2, consider that the resource 206 is resource constrained, and thus is unable to efficiently decrypt encrypted data at an appropriate rate. Alternatively (or in addition to), the data source 202 may be resource constrained and is unable to efficiently encrypt the data. As described above, in such a situation, heretofore unencrypted data was exchanged over the transmission medium 208, which if physically accessible with a data analysis tool or the like, made the data vulnerable to an automated attack.

In accordance with an aspect of the present invention, the data source incorporates or otherwise securely works with an alteration mechanism 210 to alter the original source data in some reversible way. For example, FIG. 2 shows the alteration mechanism 210 comprising an interspersion mechanism that mixes meaningless or intentionally false data (e.g., shown as the shaded rectangular blocks) in with the sensitive data 204 (the clear rectangular blocks) prior to transmission to the resource 206. The interspersed data may comprise one or more random bits, a block of bits, or whatever is appropriate for the mixing within the separable parts (e.g., bits) of the sensitive data. For example, with a character stream, varying lengths of random bits would temporarily convert meaningful characters into entirely other characters, whereas with a stream of media blocks, random media data blocks may be inserted specifically to frustrate an analyzer that was designed made to extract media data from start codes, control data blocks and so on.

At the resource 206, a reverse alteration mechanism 212 reverses the altered data and essentially reconstructs the original source data. In the example of FIG. 2 in which meaningless or false data was interspersed in the stream to alter it, the reverse alteration mechanism comprises an extraction mechanism that maintains the sensitive data $204_T$ (where the subscript T represents transmitted) and discards the interspersed data. To this end, the alteration mechanism 210 and the reverse alteration mechanism 212 are synchronized to agree on which bits or blocks of bits in the data stream are to be stripped from the data.

Synchronization may be performed by hard coding and/or by any number of suitable algorithms of a variety of complexities that may be used to determine where bits are to be padded in the data stream and then extracted, even though use of the algorithm and/or the extraction itself (e.g., via one or more shift instructions) requires relatively little computational power. In one embodiment, a variable synchronization mechanism 214 such as one based on the system clock or a counter may be used to keep the source and destination in the same operating mode at the same time. For example, a value available to both from the clock or a counter may be used to compute values/build respective internal tables that the alteration mechanism 210 uses to determine when to insert a bit, e.g., via a shift and OR operations. A similar computation/internal table may be used by the logic in the reverse alteration mechanism 212 to remove the padded bits. For example, a system clock value may be used to determine where in the data stream to pad/remove bits or blocks during one time frame, where in the data stream to pad/remove bits or blocks in the next time frame, and so on. A counter of the number of bits may alternatively be used in a similar manner, e.g., between bytes 1 and 100 use one list of values to pad/remove data, between 101 and 200 use another list and so on. A counter may be used in conjunction with a system clock to make the algorithm more difficult to break, and/or the computations/tables may be variable per session. The extraction information may also be transmitted, and/or even put into some (or all) of the discarded bits, e.g., instead of sending a random pattern of zeros and ones, a trigger value is occasionally sent that changes the list of bits to discard to another list; note that in such a case, at least some of the discarded bits are not simply meaningless, but may form their own concealed message. As long as the algorithm was reasonably complex and kept confidential outside of the endpoint modules 202 and 206, automated analysis tools will be unable to recognize the patterns needed to read the data stream.

Figure 3:
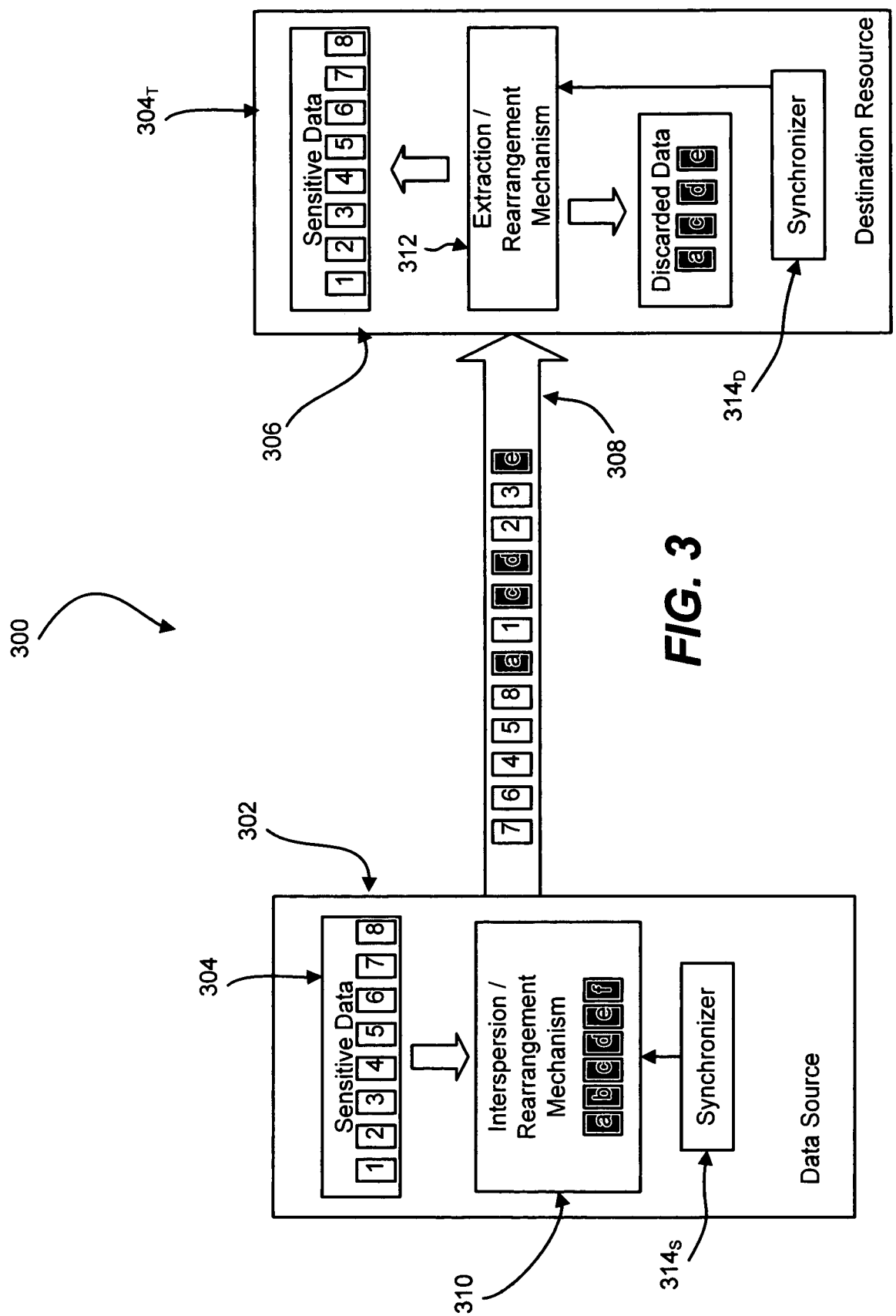
FIG. 3 is a block diagram generally representing an example data source and constrained resource architecture in which data is selectively interspersed and rearranged at the source and extracted and rebuilt at the destination to hinder automated attacks, in accordance with various aspects of the present invention.

FIG. 3 shows another alternative implementation that likewise frustrates automated attacks, namely a combination interspersion/rearrangement mechanism 310 on the data source 302, and a like rearrangement/extraction mechanism on the destination resource 306. In this alternative, at the source endpoint 302 the sensitive data 304 is rearranged (scrambled) in addition to being padded. At the destination endpoint 306, the post-transmitted, reconstructed sensitive data $304_T$ is rearranged into the proper order and the padded bits extracted from the stream. Separate synchronizers $314_S$ and $314_D$ are shown on the data source 302 and the destination resource 306, respectively, for purposes of example, although as is understood, a common synchronization mechanism (such as a clock or counter exemplified in FIG. 2) may be used with this alternative.

As can be readily appreciated, the rearranging and padding may be performed in the opposite order, as long as the destination resource operates in a corresponding order. Indeed, the synchronizer or synchronizers may be arranged to flip the order from time to time such that sometimes padded data is rearranged before sending, sometimes rearranged data is padded before sending. Again, while such algorithms would be complex to reverse engineer merely from viewing the data, as long as the data source and destination resource are synchronized to agree on the padding/rearrangement pattern (and order), the actual implementing of the operations needed to rearrange and extract (or extract and rearrange) require relatively little computational power.

The following sets forth example methods by which data may be altered in accordance with various aspects of the present invention to hinder detection schemes (note that combinations may be used as well):

To foil a probability analysis detection given a probability analysis scenario (PAS)=[{(key, encrypted data) over bus} and {known encryption algorithm} and {known decrypted probability distribution function characteristics}], blocks of truly random data are interspersed within the (key, encrypted data) block. This data remains random regardless of the decryption key attempted, whereby automated analysis will fail to differentiate the correctly decrypted data from incorrectly decrypted data to a sufficient degree to find the correctly decrypted data.

To foil automated analysis of a data extraction scenario (DaES)=[{(media, control data) over bus] & {known bit stream characteristics}}, characteristic patterns are omitted/variably transformed, and/or bogus characteristic patterns and bits inserted. Note that this example is not limited to media data.

As described above, for these methods to work, synchronization is needed between the source and the destination as to which data is real and which is not. There are various ways to achieve this depending on the specific device design. For example, for probability analysis scenarios in consumer electronic devices where the destination and source are connected by a bus and by a control channel, software in both modules is coded with the same table of offsets, e.g., a list of (offset, length) pairs. Each entry (offset, length) is used, as follows:

After the offset (O) bytes of real data, throw away the length (L) bytes of junk data. When transmission starts, as part of the control protocol between the source S and the destination D, S sends a random index into this offset table to which D initializes itself. Thereafter, S causes the offset entry in use to change, at its discretion. This can be done in various ways, including an example in which the control channel is used to send the next offset entry. This new entry will be used after the offset O (or the length L, or some function of O and/or L) uses of the current offset entry. This cycle repeats until the data has been fully transmitted; (the newly calculated offset entry is wrapped around if it exceeds the total length of the offset table).

In another example way, a clock pulse is periodically generated which causes both S and D to switch to another offset entry at a specific instance. This new offset can be based on a pre-determined relative scheme, such as the next entry in the table, or an absolute scheme such as the entry [n] of the table where n is the value of the last byte transmitted under the previous offset. The device needs to be capable of precise synchronization around clocking for this scheme to be feasible; however, it does provide very strong security. Even if the offset table is known to the attacker, this scheme offers resistance to automated analysis since reliable automated interception of clock channels and synchronization of the analysis tool to this clock is nearly impossible.

Another example way uses a 'secret' algorithm to determine which data is real and which is junk. For example, the separation algorithm may be embedded within the computer program itself, and the code may be written such that it properly accesses code segments in the correct places, and never tries to execute based on the junk data. Note that in this case the junk data is determined and inserted once, at the time that the software is developed.

For cases of DaES, structured data rather than random data are inserted. In this case, for video, the inserted data may either be placed within RLC (run length coded) segments or may emulate the start of a new frame. The first two methods discussed above for the probability analysis scenario apply equivalently to the case of DaES.

Another method which can be used in the DaES case is masking of characteristic patterns using simple XOR techniques. A basic math principle here is that ((A XOR B) XOR B)=A. The destination and source may be programmed to generate a certain XOR bit pattern at run time; the destination in fact may provide the seed for generating this pattern as part of its startup protocol with the source, or both the destination D and the source S may derive the seed using a secret algorithm on data which is part of the startup protocol. At a pre-regulated data interval or intervals, the source XORs outgoing data and the destination XORs incoming data with this bit pattern. This masks the bit patterns upon which automated analysis would depend to extract the data.

The data interval or intervals may be determined in a variety of ways. For example, a method similar to the offset table methods described above may be used. Alternatively, the next interval may be determined dynamically based on the result of a secret algorithm or condition upon the media data being transmitted, e.g. starting from the tenth byte with a least significant bit of zero, starting at every thirtieth byte, or by calculating a running sum of each byte and applying the pattern when the sum exceeds a certain value. Note that these conditions are applied on "non-XORed" data in order for synchronization between the source and the destination to be possible. The choice of a certain algorithm for a given device depends on the computational capability of the destination and/or the source, as well as on the length of the XOR bit pattern that will be used and the degree of security required for the media.

Figure 4:
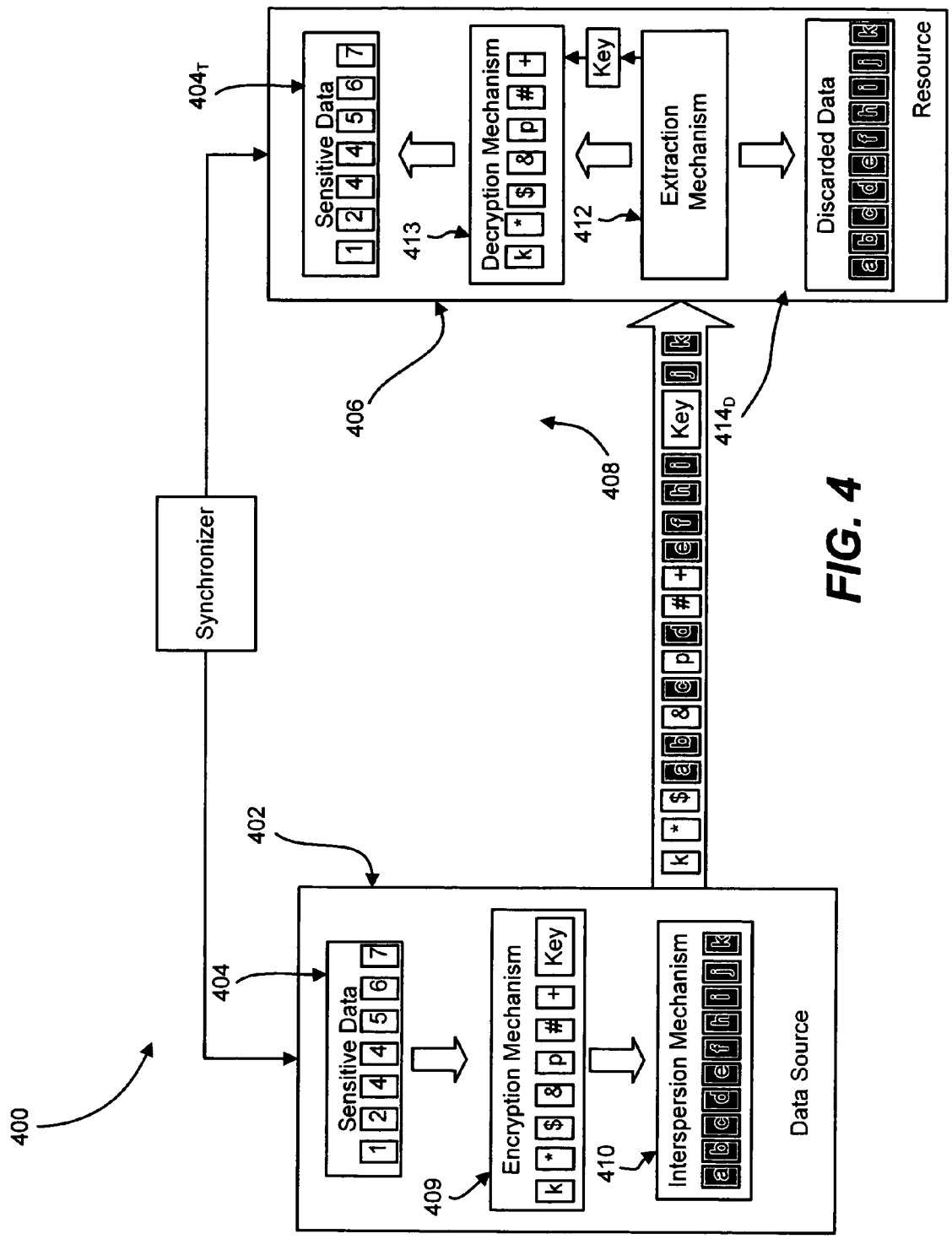
FIG. 4 is a block diagram generally representing an example data source and constrained resource architecture in which data is selectively interspersed and encrypted at the source and extracted and decrypted at the destination to hinder automated attacks, in accordance with various aspects of the present invention.

FIG. 4 represents another alternative, in which encryption is available at the data source 402 via an encryption mechanism 409, but in a security-constrained resource in which the key (or the key which encrypts a decryption key in transit) needs to be transmitted to the destination resource 406 to perform decryption. The key may change from time to time, similar to changing the data stream location in which bits or blocks of bits are interspersed from time to time. However, if the key does not change, once the destination has it, the need to intersperse data is lessened, or even eliminated, unless the design wishes to incorporate plausible deniability and/or honeypot characteristics.

In keeping with the present invention, instead of only encrypting the source data, bits or blocks of bits are altered (e.g., interspersed by an interspersion mechanism 410) at the source and reverse altered (e.g., extracted by an extraction mechanism 412) at the destination resource 406. The key may then be available. The extracted data is then decrypted via a decryption mechanism 413 into the corresponding original data $404_T$. Similar to the rearrangement described above with reference to FIG. 3, the encryption may be performed after the interspersing of the additional data or before the interspersing, and this may change from time to time, as long as the destination resource 406 keeps in synchronization with the current key and the order in which it decrypts and extracts.

The reason that interspersing bits into encrypted data with a transmitted key frustrates automated attacks is that via probability analysis, the key can be automatically found by trying values as the key and looking for signatures of patterns of bit distributions. For example, encrypted text is reasonably uniform probability distribution, whereas typical plain text has a different pattern, e.g., in plaintext, the English language has more "e" letters than "x" letters, more "a" letters than "q" letters, and such signatures can be detected without significant manual intervention to indicate when a guessed-at key is correct. Common words can also be searched for. Software has another type of distribution pattern, so if looking for a key among encrypted software, such a pattern often can be automatically recognized when the key is found and decrypts correctly. Compressed and uncompressed media also can be recognized.

However, with the present invention, even with the correct key, such signatures are not found when the padded data is present in the data stream, thereby breaking the automated probability analysis. Note that although not shown for purposes of simplicity, it is straightforward to combine the padding and rearrangement mechanisms of FIG. 3 with the encryption/decryption mechanisms of FIG. 4 into a still more complex system.

Figure 5:
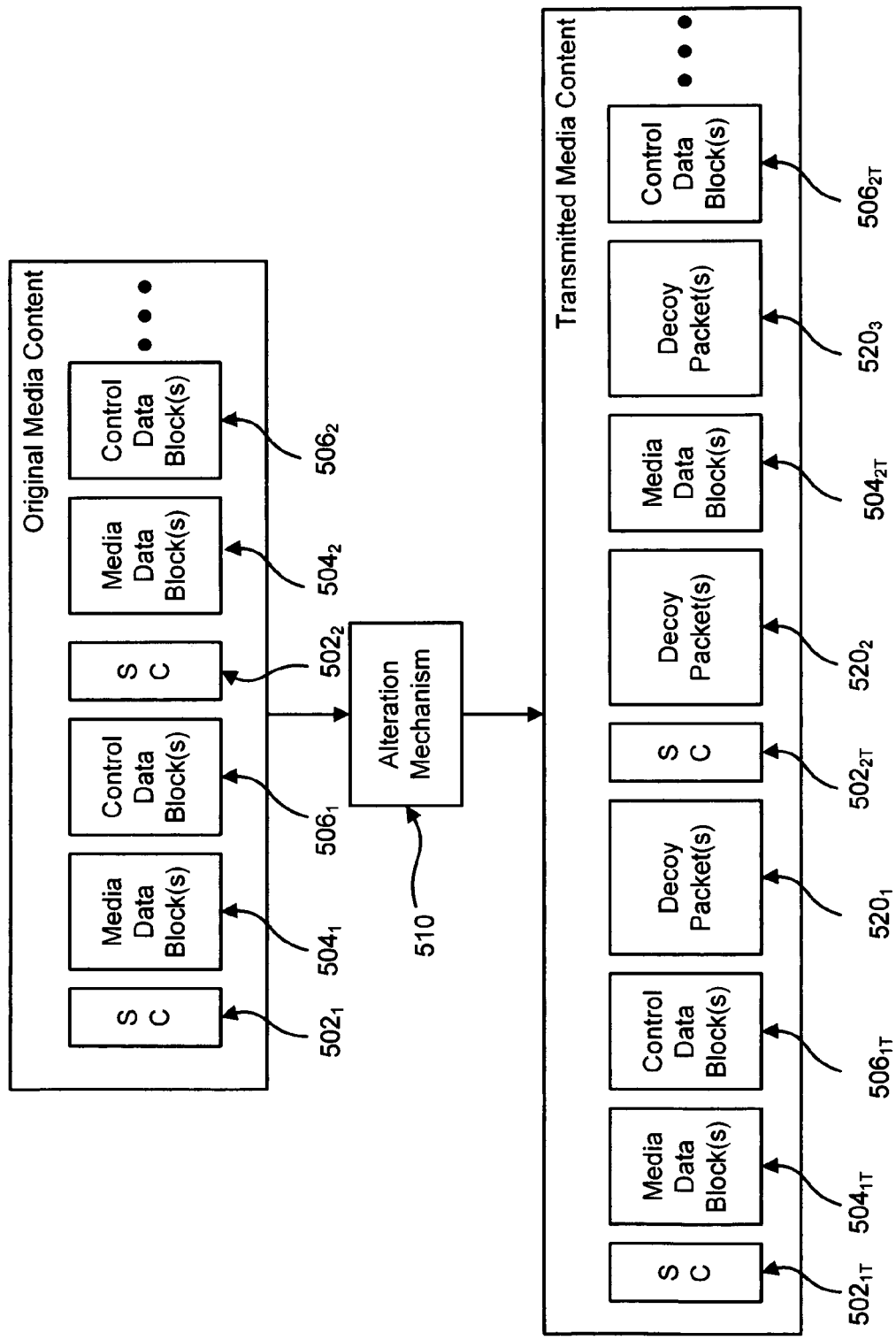
FIG. 5 is a representation of media data blocks with interspersed meaningless data arranged to hinder automated attacks, in accordance with various aspects of the present invention.

FIG. 5 represents another type of data that may be protected via various aspects of the present invention, namely compressed media content. In general, with media content, start codes (e.g., $502_1$ and $502_2$) are followed by media data blocks (e.g., $504_1$ and $504_2$) combined with control data blocks (e.g., $506_1$ and $506_2$). The start codes comprise well-known, published standard bit patterns that can be quickly recognized by a logic analyzer, from which the byte length of subsequent packets and other data may be determined. Present media-content attack mechanisms operate by looking for the start code patterns, and building probability tables over time from one packet to the next.

In accordance with various aspects of the present invention, an alteration mechanism 510 alters the data stream, e.g., by inserting decoy (or illegitimate) packets (e.g., $520_1$-$520_3$) into the data stream, causing automated analyzing tools to build probability tables that are unusable. As described above, via synchronization, the properly authorized receiving module (not shown in FIG. 5) knows which of the packets to discard, whereby the transmitted data content is reassembled properly. Note that the decoy packets can be made to resemble start codes, media data blocks and/or control blocks, or may simply be "noise" inserted into the stream that makes the start code lengths incorrect unless the decoy packets are first removed.

As can be seen from the foregoing detailed description, there is provided a method and system that prevents automated attacks from stealing data from accessible paths. The method and system generally operate by altering the source data at a data source and synchronizing an alteration mode of the data source with a reverse alteration mode of a destination resource, so that the sensitive data is reconstructed to its original pattern. If the alteration is such that automated attacks are precluded, the proliferation of attacks is significantly reduced by requiring manual intervention to steal data.

Alteration may include interspersing data of varying lengths within the sensitive data, wherein to the extent possible, the interspersed data has the same probability distribution as the original data (or encrypted data, as the case may require), and has bit pattern characteristics similar to the original data. As each end-point has built-in logic to determine which of the bits are real data, the real data may be rebuilt, however because this logic is not discoverable in open traffic, it is resistant to discovery.

Further, where encrypted data travels with its encryption key, altering the data such as by interspersing random data in the message breaks automated analysis attacks that would otherwise determine the key, because any test decryption does not match an expected probability distribution of the unencrypted data.

As can be seen from the foregoing detailed description, various types of data may be protected by the present invention, including computer executable code on its way from secure storage to an execution environment. The capture of the executable code would enable reverse engineering, which in turn allows breaching security of the device. The present invention hinders automated methods, which generally detect successful decryption of such data via probability distribution calculations or via recognizing characteristic bit patterns of binary code.

Another type of data that may be protected is compressed multimedia data on its way from the point of decryption to the point of decompression. The capture of compressed data enables the widespread unauthorized distribution of the content. The present invention hinders automated methods, which generally detect the successful decryption of such data by recognizing publicly distributed characteristic bit patterns combined with publicly distributed syntax and semantic rules that the compressed data stream obeys. Similarly, confidential input, output, text or any other data which should be protected from discovery as it travels across an accessible path in the device or computer can be protected using methods derived from the schemes laid out in the present invention.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a digital computing system in which a data source and a destination resource communicate with one another by transferring a stream of digital data, such as bits, blocks, packets or other data groupings, over a transmission medium that is accessible and thus potentially not secure, and wherein one or the other of the data source and the destination resource, or both, either lack the computational resources needed to perform encryption and decryption, or both, for the exchanged stream of digital data, or wherein one or the other of the data source and the destination resource, or both, are security constrained in the sense that a key needs to be transmitted to the destination resource in order to use the key to access the transferred digital data, but the key is susceptible to discovery via the accessible unsecure transmission medium, a method for protecting the exchanged stream of digital data from unauthorized access when transferring it over the unsecure transmission medium, comprising:

at the data source of the digital computing system, altering the digital data stream to be transmitted by either interspersing false data into the data stream prior to its transmission, or by rearranging the sequence of transmission of individual data in the data stream, or both;

transmitting the altered digital data stream over the unsecure transmission medium to the destination resource of the digital computing system;

receiving the altered digital data stream at the destination resource of the digital computing system;

at the destination resource of the digital computing system, reversing the alteration of the digital data stream by either removing false data that has been interspersed into the data stream, reversing the rearrangement of the sequence of transmission of individual data in the data stream, or both; and synchronizing the destination resource with the data source so that the destination resource is able to reverse the alteration of the digital data stream by using the synchronization to either correctly detect false data that has been interspersed into the data stream so that it can be removed, correctly detect the rearrangement of the sequence of transmission of individual data so the sequence can be returned to its original sequence prior to the rearrangement, or both.

2. The method of claim 1 wherein interspersing false data comprises padding one or more bits between other bits of a bitstream.

3. The method of claim 2 wherein padding includes inserting one or more bits in variable lengths.

4. The method of claim 1 wherein interspersing false data comprises padding one or more packets between other packets.

5. The method of claim 1 wherein the digital data stream to be transmitted includes a key used for decryption.

6. The method of claim 1 wherein rearranging the sequence of transmission of individual data comprises changing at least one bit to another value via at least one logical operand.

7. The method of claim 6 wherein the logical operand is at least one operand of a set containing AND, OR and XOR operands.

8. The method of claim 1 wherein synchronizing the destination resource with the data source comprises synchronizing the destination resource and the data source based on a clock value.

9. The method of claim 1 wherein synchronizing the destination resource with the data source comprises synchronizing the destination resource and the data source based on information communicated from the data source to the destination resource.

10. In a digital computing system in which a data source and a destination resource communicate with one another by transferring a stream of digital data, such as bits, blocks, packets or other data groupings, over a transmission medium that is accessible and thus potentially not secure, and wherein one or the other of the data source and the destination resource, or both, either lack the computational resources needed to perform encryption and decryption, or both, for the exchanged stream of digital data, or wherein one or the other of the data source and the destination resource, or both, are security constrained in the sense that a key needs to be transmitted to the destination resource in order to use the key to access the transferred digital data, but the key is susceptible to discovery via the accessible unsecure transmission medium, a computer-program product for implementing a method for protecting the exchanged stream of digital data from unauthorized access when transferring it over the unsecure transmission medium, the computer-program product comprising a computer storage medium containing executable instructions for implementing the method, and wherein the method is comprised of:

at the data source of the digital computing system, altering the digital data stream to be transmitted by either interspersing false data into the data stream prior to its transmission, or by rearranging the sequence of transmission of individual data in the data stream, or both;

transmitting the altered digital data stream over the unsecure transmission medium to the destination resource of the digital computing system;

receiving the altered digital data stream at the destination resource of the digital computing system;

at the destination resource of the digital computing system, reversing the alteration of the digital data stream by either removing false data that has been interspersed into the data stream, reversing the rearrangement of the sequence of transmission of individual data in the data stream, or both; and synchronizing the destination resource with the data source so that the destination resource is able to reverse the alteration of the digital data stream by using the synchronization to either correctly detect false data that has been interspersed into the data stream so that it can be removed, correctly detect the rearrangement of the sequence of transmission of individual data so the sequence can be returned to its original sequence prior to the rearrangement, or both.

11. The computer-program product of claim 10 wherein interspersing additional data comprises padding one or more bits between other bits of a bitstream.

12. The computer-program product of claim 11 wherein padding includes inserting one or more bits in variable lengths.

13. The computer-program product of claim 10 wherein interspersing false data comprises padding one or more packets between other packets.

14. The computer-program product of claim 10 wherein the digital data stream to be transmitted includes a key used for decryption.

15. The computer-program product of claim 10 wherein synchronizing the destination resource with the data source comprises synchronizing the destination resource and the data source based on a clock value.

16. The computer-program product of claim 10 wherein synchronizing the destination resource with the data source comprises synchronizing the destination resource and the data source based on information communicated from the data source to the destination resource.

* * * * *